(12) United States Patent
Nishino et al.

(10) Patent No.: US 12,339,652 B2
(45) Date of Patent: Jun. 24, 2025

(54) FACILITY DIAGNOSIS DEVICE AND FACILITY DIAGNOSIS METHOD

(71) Applicant: HITACHI, LTD., Tokyo (JP)

(72) Inventors: Shuichi Nishino, Tokyo (JP); Yuichi Sakurai, Tokyo (JP); Kazuyuki Tashiro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 258 days.

(21) Appl. No.: 17/836,976

(22) Filed: Jun. 9, 2022

(65) Prior Publication Data
US 2022/0404821 A1 Dec. 22, 2022

(30) Foreign Application Priority Data
Jun. 16, 2021 (JP) .................................. 2021-99898

(51) Int. Cl.
G05B 23/02 (2006.01)
(52) U.S. Cl.
CPC ..... G05B 23/0235 (2013.01); G05B 23/0221 (2013.01); G05B 23/0283 (2013.01)
(58) Field of Classification Search
CPC ............ G05B 23/0235; G05B 23/0221; G05B 23/0283
See application file for complete search history.

(56) References Cited

U.S. PATENT DOCUMENTS 4,826,392 A * 5/1989 Hayati .................... B25J 9/0084
318/625
4,974,210 A * 11/1990 Lee ........................ B25J 9/1682
901/45

(Continued)

FOREIGN PATENT DOCUMENTS

| JP | 2017-102554 A | 6/2017 |
|---|---|---|
| JP | 2019-117464 A | 7/2019 |
| WO | 2016/189603 A1 | 12/2016 |

OTHER PUBLICATIONS

Japanese Office Action received in corresponding Japanese Application No. 2021-099898 dated Dec. 3, 2024.

Primary Examiner — Arleen M Vazquez
Assistant Examiner — Lyudmila Zaykova-Feldman
(74) Attorney, Agent, or Firm — MATTINGLY & MALUR, PC

(57) ABSTRACT

The progress of deterioration of a manufacturing facility is prevented while keeping KPI within an allowable range. A facility diagnosis device includes a deterioration prevention mode definition storage unit that stores information including an operation control method for preventing deterioration of a manufacturing facility or a portion thereof for each of predetermined deterioration prevention modes; a KPI calculation unit that calculates a predetermined KPI by using a deterioration degree predicted for each of the deterioration prevention modes for the manufacturing facility or the portion of the manufacturing facility, and determines whether the KPI satisfies a predetermined condition; a deterioration prevention determination unit that determines a deterioration prevention mode that should be executed from a satisfaction determination result; and a control information output unit that outputs control information on the manufacturing facility or the portion of the manufacturing facility according to the deterioration prevention mode that should be executed.

7 Claims, 15 Drawing Sheets

(56) References Cited

U.S. PATENT DOCUMENTS

| | | | | |
|---|---|---|---|---|
| 2006/0082944 A1* | 4/2006 | Koyanagi | ................ | H02H 3/04 |
| | | | | 361/93.1 |
| 2010/0141197 A1* | 6/2010 | Moon | .................... | B25J 9/1638 |
| | | | | 318/566 |
| 2011/0173496 A1* | 7/2011 | Hosek | ...................... | G07C 3/00 |
| | | | | 714/26 |
| 2018/0257240 A1* | 9/2018 | Hashimoto | ............. | B25J 13/06 |
| 2020/0124061 A1* | 4/2020 | Yuan | ................... | E04G 21/0436 |
| 2020/0189106 A1* | 6/2020 | Tsuchiya | .................. | B25J 19/026 |
| 2021/0187743 A1* | 6/2021 | Muneto | .................. | B25J 9/1674 |
| 2021/0190639 A1* | 6/2021 | Kivi | ................... | G01M 5/0033 |
| 2023/0150136 A1* | 5/2023 | Taguchi | .............. | G01M 13/021 |
| | | | | 74/640 |
| 2023/0161337 A1* | 5/2023 | Satou | ..................... | G06N 20/00 |
| | | | | 700/47 |
| 2023/0320795 A1* | 10/2023 | Wells | ..................... | A61B 34/37 |
| | | | | 606/130 |
| 2023/0330839 A1* | 10/2023 | Caveney | ................. | B25J 9/042 |
| 2024/0027540 A1* | 1/2024 | Lee | ...................... | G01R 31/392 |
| 2024/0058966 A1* | 2/2024 | Gawlik | ................. | B25J 9/1664 |

\* cited by examiner

FIG. 3

DETERIORATION PREVENTION MODE DEFINITION STORAGE UNIT    102

| DETERIORATION PREVENTION MODE (102a) | DETERIORATED PORTION (102b) | OPERATION METHOD DEFINITION (102c) ||||| |
|---|---|---|---|---|---|---|
| | | ARM A |||| ARM B |
| | | GRIPPER (102d) | SHAFT 1 (102e) | SHAFT 2 (102f) | SHAFT 3 (102g) | (102h) |
| MODE 1 | ARM A SHAFT 1 | NORMAL OPERATION | MEDIUM LOAD | NORMAL OPERATION | NORMAL OPERATION | NORMAL OPERATION |
| MODE 2 | ARM A SHAFT 1 | NORMAL OPERATION | SUPER LOW LOAD | HIGH LOAD | HIGH LOAD | NORMAL OPERATION |
| MODE 3 | ARM A SHAFT 1, SHAFT 3 | NORMAL OPERATION | LOW LOAD | NORMAL OPERATION | LOW LOAD | HIGH LOAD |
| ... | ... | ... | ... | ... | ... | ... |

FIG. 5
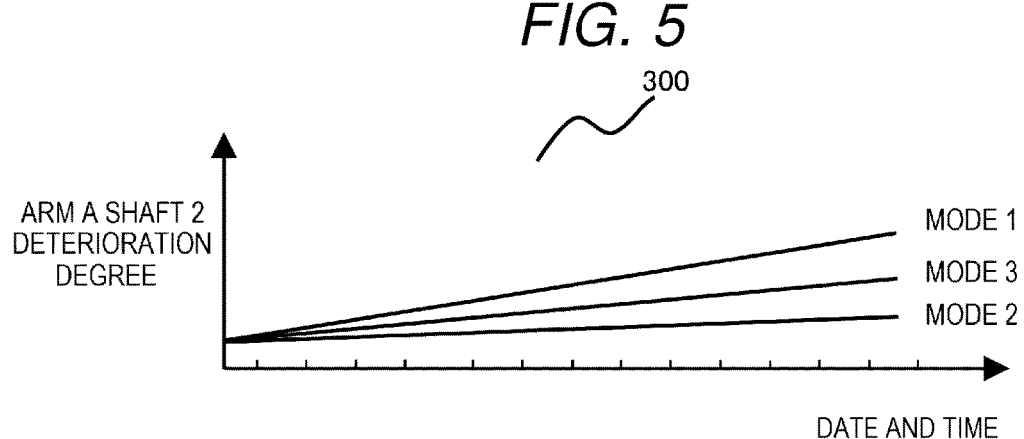
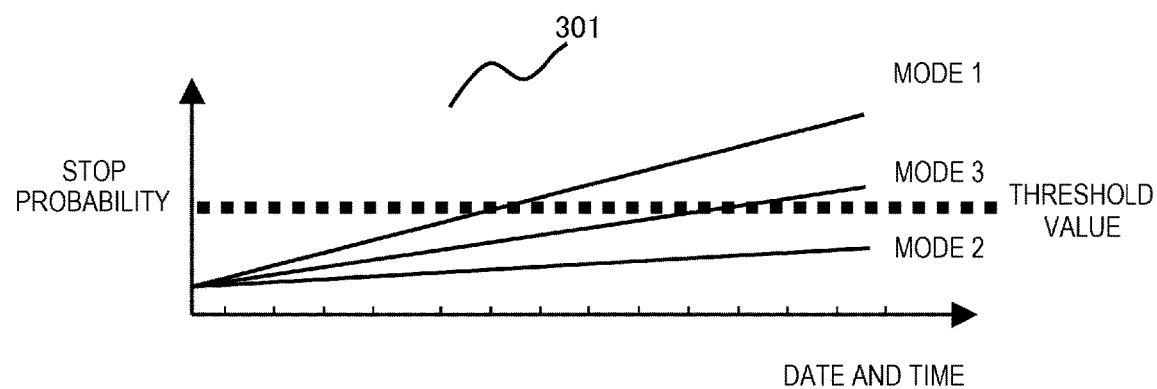

FIG. 7

KPI DEFINITION TABLE 108

108a 108b

| KPI | SATISFACTION DETERMINATION METHOD |
|---|---|
| FACILITY STOP PROBABILITY | FACILITY STOP PROBABILITY ≤ 0.01% |
| TACT TIME | TACT TIME ≤ 1 MINUTE |
| DEFECT RATE | DEFECT RATE ≤ 0.0001% |
| ... | ... |

109g

■ SELECT KPI TO BE USED FOR DETERMINATION OF DETERIORATION PREVENTION MODE

| # | KPI | SATISFIED CONDITION |
|---|---|---|
| 1 | FACILITY STOP PROBABILITY | FACILITY STOP PROBABILITY ≤ 0.01% |
| 2 | TACT TIME | TACT TIME ≤ 1 MINUTE |
| 3 | DEFECT RATE | DEFECT RATE ≤ 0.0001% |
|  | ... | ... |

SELECT KPI TO BE USED :

109h

DETERIORATION PREVENTION MODE SELECTION SCREEN

FIG. 12

PRIORITY-ATTACHED KPI DEFINITION TABLE 115

| KPI | SATISFACTION DETERMINATION METHOD | PRIORITY |
|---|---|---|
| FACILITY STOP PROBABILITY | FACILITY STOP PROBABILITY ≤ 0.01% | 1 |
| TACT TIME | TACT TIME ≤ 1 MINUTE | 2 |
| DEFECT RATE | DEFECT RATE ≤ 0.0001% | 3 |
| ... | ... | ... |

FIG. 15

PRODUCTION LINE DETERIORATION PREVENTION MODE DEFINITION STORAGE UNIT 122

| DETERIORATION PREVENTION MODE | DETERIORATED PORTION | ROBOT X OPERATION METHOD DEFINITION | | | | | ROBOT Y OPERATION METHOD DEFINITION | ROBOT Z OPERATION METHOD DEFINITION |
|---|---|---|---|---|---|---|---|---|
| | | ARM A | | | | ARM B | (OMITTED) | (OMITTED) |
| | | GRIPPER | SHAFT 1 | SHAFT 2 | SHAFT 3 | (OMITTED) | (OMITTED) | (OMITTED) |
| MODE 1 | X ARM A SHAFT 1 | NORMAL OPERATION | MEDIUM LOAD | NORMAL OPERATION | NORMAL OPERATION | NORMAL OPERATION | NORMAL OPERATION | NORMAL OPERATION |
| MODE 2 | X ARM A SHAFT 1 | NORMAL OPERATION | SUPER LOW LOAD | HIGH LOAD | HIGH LOAD | NORMAL OPERATION | NORMAL OPERATION | NORMAL OPERATION |
| MODE 3 | X ARM A SHAFT 1, X ARM B SHAFT 1 | NORMAL OPERATION | STOP | STOP | STOP | STOP | HIGH LOAD | HIGH LOAD |
| ... | ... | ... | ... | ... | ... | ... | | |

FACILITY DIAGNOSIS DEVICE AND FACILITY DIAGNOSIS METHOD

CROSS-REFERENCE TO RELATED APPLICATION

The present application claims priority from Japanese application JP2021-99898, filed on Jun. 16, 2021, the contents of which is hereby incorporated by reference into this application.

BACKGROUND OF THE INVENTION

1. Field of the Invention

The present invention relates to a facility diagnosis device and a facility diagnosis method.

2. Description of the Related Art

JP-A-2017-102554 (PTL 1) discloses a technique of "providing a cell control device that predicts a failure of a member and controls a manufacturing machine such that the manufacturing machine does not fail until a time when the member can be replaced".

The technique described in PTL 1 describes a method of predicting a failure and changing a control method of a facility or a device to continue production while preventing a progress of deterioration of the facility or the device. However, when a control method of a manufacturing facility or a manufacturing device is changed to prevent the progress of the deterioration, there is a risk of unintentional excessive lowering of a key performance indicator (KPI) related to manufacturing, for example, a manufacturing quality or productivity may be excessively lowered.

SUMMARY OF THE INVENTION

An object of the invention is to prevent progress of deterioration of a manufacturing facility while keeping a KPI within an allowable range.

In order to solve the above problem, the present application employs, for example, means described in the claims. The invention includes a plurality of means for solving the above problem, and one example thereof is a facility diagnosis device including a deterioration prevention mode definition storage unit that stores information including an operation control method for preventing deterioration of a manufacturing facility or portion of the manufacturing facility for each of predetermined deterioration prevention modes, a KPI calculation unit that calculates a predetermined KPI by using a deterioration degree predicted for each of the deterioration prevention modes for the manufacturing facility or the portion of the manufacturing facility, and determines whether the KPI satisfies a predetermined condition, a deterioration prevention determination unit that determines a deterioration prevention mode that should be executed from a satisfaction determination result, and a control information output unit that outputs control information on the manufacturing facility or the portion of the manufacturing facility according to the deterioration prevention mode that should be executed.

According to the invention, it is possible to provide a technique of preventing progress of deterioration of a manufacturing facility while keeping a KPI within an allowable range.

Problems, configurations, and effects other than those described above will be clarified by the following description of embodiments.

BRIEF DESCRIPTION OF THE DRAWINGS

FIG. 3 is a diagram illustrating a data structure example of a deterioration prevention mode definition storage unit.

FIG. 5 is a diagram illustrating deterioration prediction curves and KPI prediction examples.

FIG. 7 is a diagram illustrating a data structure example of a KPI definition table.

FIG. 12 is a diagram illustrating a data structure example of a priority-attached KPI definition table.

FIG. 15 is a diagram illustrating a data structure example of a production line deterioration prevention mode definition storage unit.

DESCRIPTION OF THE PREFERRED EMBODIMENTS

Figure 1:
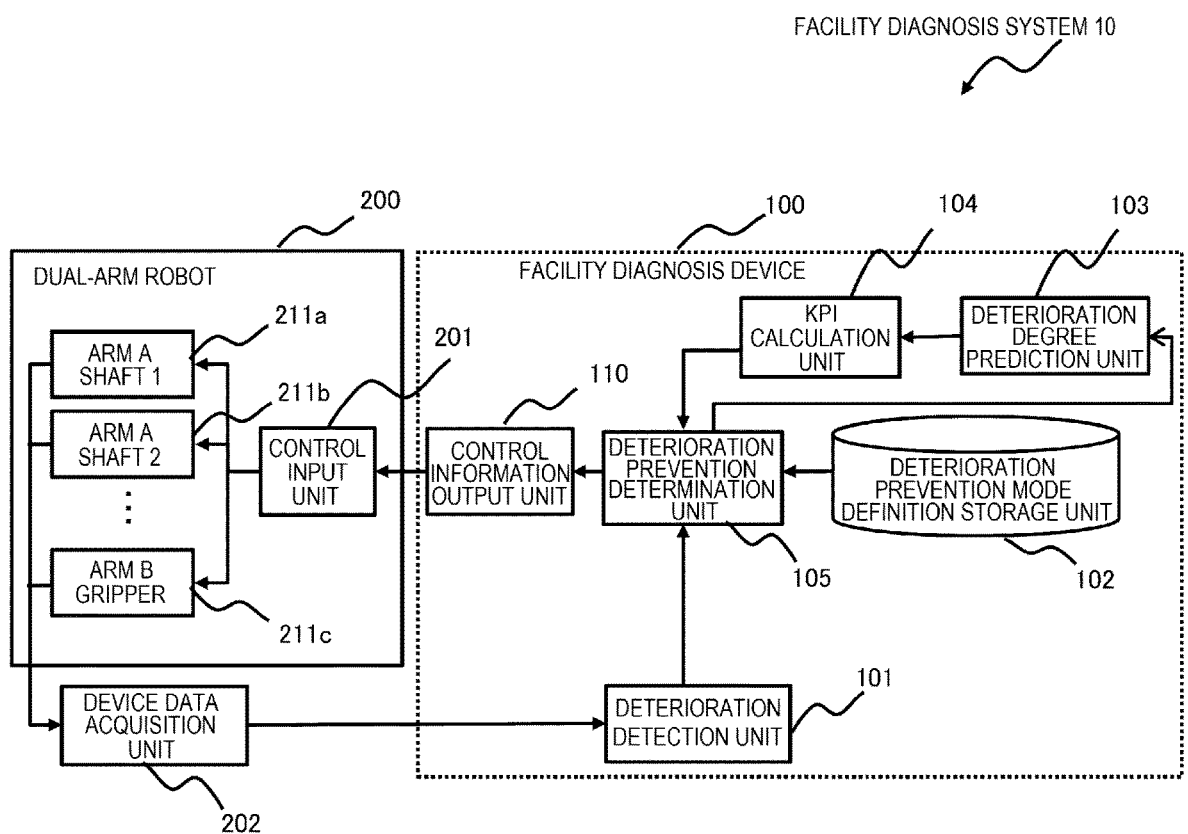
FIG. 1 is a diagram illustrating a configuration example of a facility diagnosis system according to a first embodiment.

In the following embodiments, description may be divided into plural sections or embodiments when necessary for convenience. Unless particularly specified, the sections or embodiments are not independent of each other, but have a relation such that one is a modification, detailed description, supplementary description, or the like of a part or all of the others.

In the following embodiments, when a number or the like (including a number, a numeric value, an amount, a range, and the like) of an element is referred to, the number or the like is not limited to a specific number, and may be equal to, greater than or less than the specific number, unless otherwise specified or clearly limited to the specific number in principle.

Further, in the embodiments described below, it is needless to say that the elements (including element steps) are not always essential unless otherwise stated or considered as apparently essential in principle.

Similarly, in the following embodiments, when reference is made to shapes, positional relations, and the like of the elements or the like, those having substantially approximate or similar shapes or the like are inclusive unless otherwise particularly specified or considered to be clearly not inclusive in principle. The same applies to numerical values and ranges.

In all the drawings for illustrating the embodiments, the same members are denoted by the same reference signs in principle, and repetitive descriptions thereof will be omitted. However, a different reference sign or name may be given to the same member when a name shared by members before and after a change due to an environmental change or the like is highly probable to cause confusion. Hereinafter, each embodiment of the invention will be described with reference to the drawings.

In general, manufacturing facilities include various devices, and devices used for manufacturing an industrial product include a robot device including a moveable arm. In addition, manufacturing devices also include a production line device including a plurality of such robot devices and controlling an integrated movement. In the embodiments according to the invention, basically, a dual-arm robot 200 including two movable arms (hereinafter, each arm may be referred to as an arm A or an arm B for convenience) is assumed as the manufacturing device. Each arm has three degrees of freedom, and a gripper for gripping and moving an object is provided at a tip end of the arm.

In the embodiments according to the invention, unless otherwise specified, a movable shaft 1 of the arm A of the dual-arm robot 200 is referred to as "arm A shaft 1 (211*a*)", and a movable shaft 2 of the arm A is referred to as "arm A shaft 2 (211*b*)". Further, the gripper of the arm B is referred to as "arm B gripper (211*c*)". The shaft and the gripper of each arm of the dual-arm robot 200 include a motor, and operate by controlling rotation of the motor based on control information received by a control input unit 201.

In the following embodiments, an "input unit" and an "output unit" may be one or more interface devices. The one or more interface devices may be at least one of the following.

One or more input/output (I/O) interface devices. The I/O interface device is an interface device for at least one of an I/O device or a remote display computer. The I/O interface device for a display computer may be a communication interface device. At least one I/O device may be a user interface device, for example, either an input device such as a keyboard and a pointing device or an output device such as a display device.

One or more communication interface devices. The one or more communication interface devices may be one or more communication interface devices of the same type (for example, one or more network interface cards (NICs)) or may be two or more communication interface devices of different types (for example, an NIC and a host bus adapter (HBA)).

In the following description, a "memory" may be one or more memory devices as an example of one or more storage devices, and may typically be a main storage device. At least one memory device in the memory may be a volatile memory device or a nonvolatile memory device.

In the following description, a "storage unit" may be one or more persistent storage devices as an example of one or more storage devices. Typically, the persistent storage device may be a non-volatile storage device (for example, an auxiliary storage device), and may specifically be, for example, a hard disk drive (HDD), a solid state drive (SSD), a non-volatile memory express (NVME) drive, or a storage class memory (SCM).

In the following description, a "storage unit" or a "storage device" may be a memory or both a memory and a persistent storage device.

In the following description, a "processing unit" or a "processor" may be one or more processor devices. Typically, at least one processor device may be a microprocessor device such as a central processing unit (CPU), and may also be another type of processor device such as a graphics processing unit (GPU). At least one processor device may be a single-core processor device or a multi-core processor device. At least one processor device may be a processor core. At least one processor device may be a processor device in a broad sense, such as a circuit which is a collection of gate arrays in a hardware description language that performs a part or all of processing (for example, a field-programmable gate array (FPGA), a complex programmable logic device (CPLD), or an application specific integrated circuit (ASIC)).

In the following description, an expression of "yyy unit" may be used to describe a function. The function may be implemented by a processor executing one or more computer programs, or may be implemented by one or more hardware circuits (for example, an FPGA or an ASIC), or may be implemented by a combination of the above implementation methods. When the function is implemented by the processor executing the program, since predetermined processing is executed by appropriately using a storage device and/or an interface device, the function may be at least a part of the processor. Processing described using the function as a subject may be processing performed by a processor or by a device including the processor. The program may be installed from a program source. The program source may be, for example, a recording medium (for example, a non-transitory recording medium) readable by a program distribution computer or a computer. A description for each function is an example, and a plurality of functions may be combined into one function, or one function may be divided into a plurality of functions.

In the following description, processing may be described using a "program" or a "processing unit" as a subject. Alternatively, the processing described using the program as a subject may be processing performed by a processor or by a device including the processor. Further, two or more programs may be implemented as one program, or one program may be implemented as two or more programs.

In the following description, an expression of "xxx table" may be used to describe information that is acquired as an output for an input. The information may be a table of any structure, and may be a learning model that generates an output for an input, such as a neural network, a genetic algorithm, and a random forest. Therefore, the "xxx table" can be referred to as "xxx information". Further, in the following description, a configuration of each table is an example, and one table may be divided into two or more tables, or two or more tables may partially or entirely be one table.

In the following description, a "facility diagnosis system" may be a system including one or more physical computers or a system (for example, a cloud computing system) implemented on a physical calculation resource group (for example, a cloud infrastructure). "Displaying" display information by the facility diagnosis system may refer to displaying the display information on a display device provided in a computer, or may refer to transmitting the display information from the computer to a display computer (in the latter case, the display information is displayed by the display computer).

First Embodiment

FIG. 1 is a diagram illustrating a configuration example of a facility diagnosis system according to a first embodiment. A facility diagnosis system 10 includes, as facilities for diagnosis, the dual-arm robot 200 which is a manufacturing device provided in a manufacturing site (area), a facility diagnosis device 100, and a device data acquisition unit 202 that acquires information necessary for diagnosis from the dual-arm robot 200.

The facility diagnosis device 100, the dual-arm robot 200, and the device data acquisition unit 202 are communicably connected to each other via a network or a communication line (not illustrated).

The network is, for example, any one of a communication network using a part or all of a general public line such as a local area network (LAN), a wide area network (WAN), a virtual private network (VPN), and the Internet, a mobile phone communication network, or the like, or a combined network thereof. The network may be a wireless communication network such as Wi-Fi (registered trademark) or 5th Generation (5 G).

The device data acquisition unit 202 acquires information used to detect deterioration of a diagnosis target facility. The device data acquisition unit 202 is, for example, a current sensor or the like. When a diagnosis target is a portion controlled by a motor, the device data acquisition unit 202 is disposed on a connection line with a power supply in order to acquire a driving current of the motor, and is used. Alternatively, when a device capable of measuring the drive current in advance is the diagnosis target, the device data acquisition unit 202 acquires a measured driving current.

The facility diagnosis device 100 acquires measurement information obtained from the diagnosis target facility to select a deterioration prevention mode so as to satisfy a necessary KPI, and outputs control information on the diagnosis target facility.

More specifically, the facility diagnosis device 100 acquires information on the diagnosis target facility, that is, control target portions measured from the dual-arm robot 200 via the device data acquisition unit 202. Then, the facility diagnosis device 100 measures deterioration degrees from the information on the control target portions measured by a predetermined algorithm to specify deteriorated portions, and specifies one or more candidates of the deterioration prevention mode according to the deteriorated portions.

The facility diagnosis device 100 predicts deterioration curves according to combinations of the deterioration degrees of the deteriorated portions and the deterioration prevention modes, and predicts a change of the KPI for each of the deterioration curves. When the predicted change of the KPI satisfies a predetermined threshold value, the facility diagnosis device 100 outputs a deterioration prevention mode that satisfies the threshold value as a control mode of the diagnosis target facility.

The facility diagnosis device 100 includes, as processing units, a deterioration detection unit 101, a deterioration degree prediction unit 103, a KPI calculation unit 104, a deterioration prevention determination unit 105, and a control information output unit 110. The facility diagnosis device 100 includes a deterioration prevention mode definition storage unit 102 as a storage unit.

The deterioration detection unit 101 obtains a facility feature amount from the dual-arm robot 200, estimates a deterioration degree of each portion of the dual-arm robot 200, and inputs deteriorated portions and deterioration degrees thereof to the deterioration prevention determination unit 105.

Figure 2:
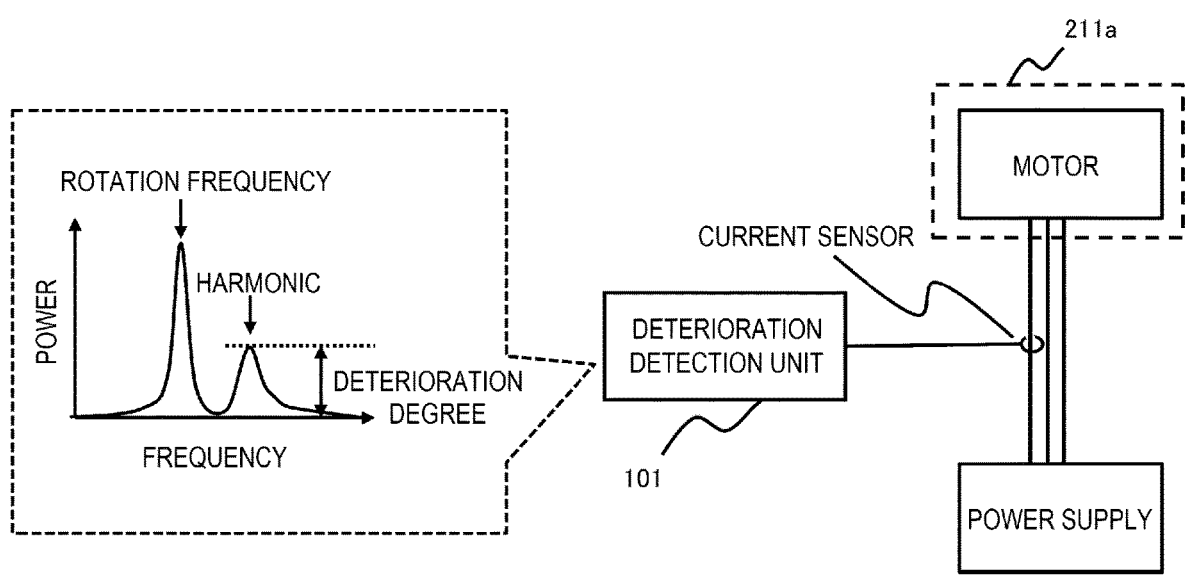
FIG. 2 is a diagram illustrating an example of a deterioration detection method.

FIG. 2 is a diagram illustrating an example of a deterioration detection method. The deterioration detection unit 101 measures a driving current of the motor corresponding to each movable shaft of the dual-arm robot 200 as the facility feature amount by the current sensor serving as the device data acquisition unit 202, and measures a deterioration degree of the motor from power of a harmonic band with respect to a rotation frequency.

When the deterioration detection unit 101 acquires a facility feature amount of a member other than the motor, the deterioration detection unit 101 may acquire a preset feature amount according to the feature amount. For example, in a case of a facility in which clogging of a filter is deteriorated, the deterioration detection unit 101 may acquire an image of the filter, a flow velocity before and after the filter, and a pressure as the facility feature amount. In addition, also when the facility feature amount of the motor is acquired, the deterioration detection unit 101 may acquire, as the feature amount, sound by using a microphone, or vibration amount by using a vibration sensor, instead of a value of the current sensor.

The deterioration degree prediction unit 103 predicts a deterioration prediction curve for one of the deterioration prevention mode candidates. Specifically, the deterioration degree prediction unit 103 specifies a function of approximating a deterioration degree that progresses when the deterioration prevention mode is used. For example, the deterioration degree prediction unit 103 specifies the deterioration degree as a function that approximates a predetermined linear function $f\_m(t)=K\_m \cdot N \cdot t + b$ (m is the deterioration prevention mode, t is a time, K_m is a coefficient indicating a deterioration degree per manufacturing unit, N is a standard manufacturing amount per unit time, and b is a deterioration degree when t=0).

The KPI calculation unit 104 performs KPI calculation and satisfaction determination by using the deterioration prediction curve, that is, a deterioration degree predicted for each of the deterioration prevention modes for a manufacturing facility or a portion of the manufacturing facility as an input. Specifically, when the KPI calculation unit 104 receives the function specified by the deterioration degree prediction unit 103, the KPI calculation unit 104 calculates a predetermined KPI by a predetermined algorithm with an elapse of time. For example, based on a finding that the deterioration degree and a stop probability are in a proportional relationship, it is conceivable that the KPI calculation unit 104 multiplies a slope of the deterioration prediction curve by a positive constant and normalizes the slope to obtain the stop probability. A definition and calculation method of the KPI is not limited to this. For example, based on a finding that the deterioration degree and manufacturing quality of a target facility are in a negative proportional relationship, it is also conceivable to multiply the deterioration prediction curve by a negative constant and normalize the deterioration prediction curve to calculate the manufacturing quality as a KPI.

As the satisfaction determination for determining whether the KPI satisfies a predetermined condition, for example, the KPI calculation unit 104 determines that the deterioration prevention mode satisfies a predetermined condition that is a requirement of the KPI if the KPI is equal to or less than a threshold value, and that the deterioration prevention mode does not satisfy the predetermined condition if not.

The deterioration prevention determination unit 105 determines a deterioration prevention mode that should be executed from a satisfaction determination result. Specifically, the deterioration prevention determination unit 105 receives, as inputs, a KPI calculation result and a satisfaction determination result of each deterioration prevention mode candidate from the KPI calculation unit 104, determines one determined as satisfied among the deterioration prevention mode candidates as the deterioration prevention mode that should be executed, and outputs to the control information output unit 110.

The control information output unit 110 outputs control information on the manufacturing facility or the portion of the manufacturing facility according to the deterioration prevention mode that should be executed. Specifically, the control information output unit 110 receives the deterioration prevention mode output from the deterioration prevention determination unit 105, and outputs the control information corresponding to the deterioration prevention mode to the control input unit 201 of the dual-arm robot 200. For example, the control information output unit 110 outputs an instruction to control a load for each of control portions according to the deterioration prevention mode.

FIG. 3 is a diagram illustrating a data structure example of a deterioration prevention mode definition storage unit. The deterioration prevention mode definition storage unit 102 stores information including an operation control method for preventing deterioration of the manufacturing facility or the portion of the manufacturing facility for each of predetermined deterioration prevention modes. Specifically, the deterioration prevention mode definition storage unit 102 includes a deterioration prevention mode 102a associated with a deteriorated portion 102b and an operation method definition 102c thereof. The operation method definition 102c includes an operation mode for each of the control portions of the arm of the dual-arm robot 200, for example, a gripper 102d indicating the gripper of the arm A, a shaft 1 (102e) indicating the movable shaft 1 of the arm A, a shaft 2 (102f) indicating the movable shaft 2 of the arm A, and a shaft 3 (102g) indicating a movable shaft 3 of the arm A. An arm B (102h) indicating the entire arm B may be included.

In each deterioration prevention mode, a "normal operation" indicates an operation method in a normal mode, and any one of operation methods of a "high load" having a higher load than the normal operation, a "medium load", a "low load", and a "super low load" having a load lower than the normal operation may be set. When the load is high, a deterioration speed is fast, and when the load is low, the deterioration speed is slow. Since specific operations are different depending on the portions of the manufacturing facility, a difference in a degree of the load specifically appears in predetermined control for each of the portions. For example, in the case of a portion that performs repetitive operation, the load is determined depending on a frequency or the like.

In the example of FIG. 3, a mode 1 is a mode in which the deterioration is prevented by setting a load applied to the deteriorated arm A shaft 1 to a medium load. Specifically, for an operation using the shaft 1, a method of decreasing an execution frequency may be considered. A mode 2 is a mode in which an operation rate of the arm A shaft 1 is set to a super low frequency, and instead, loads of the arm A shaft 2 and an arm A shaft 3 are increased to compensate. A mode 3 corresponds to a case where the arm A shaft 3 is also in a deteriorated state in addition to the arm A shaft 1, and is a mode in which loads on both shafts are reduced, and reduction in an operation rate of the arm A due to load reduction is compensated by increasing an operation rate of the arm B.

Figure 4:
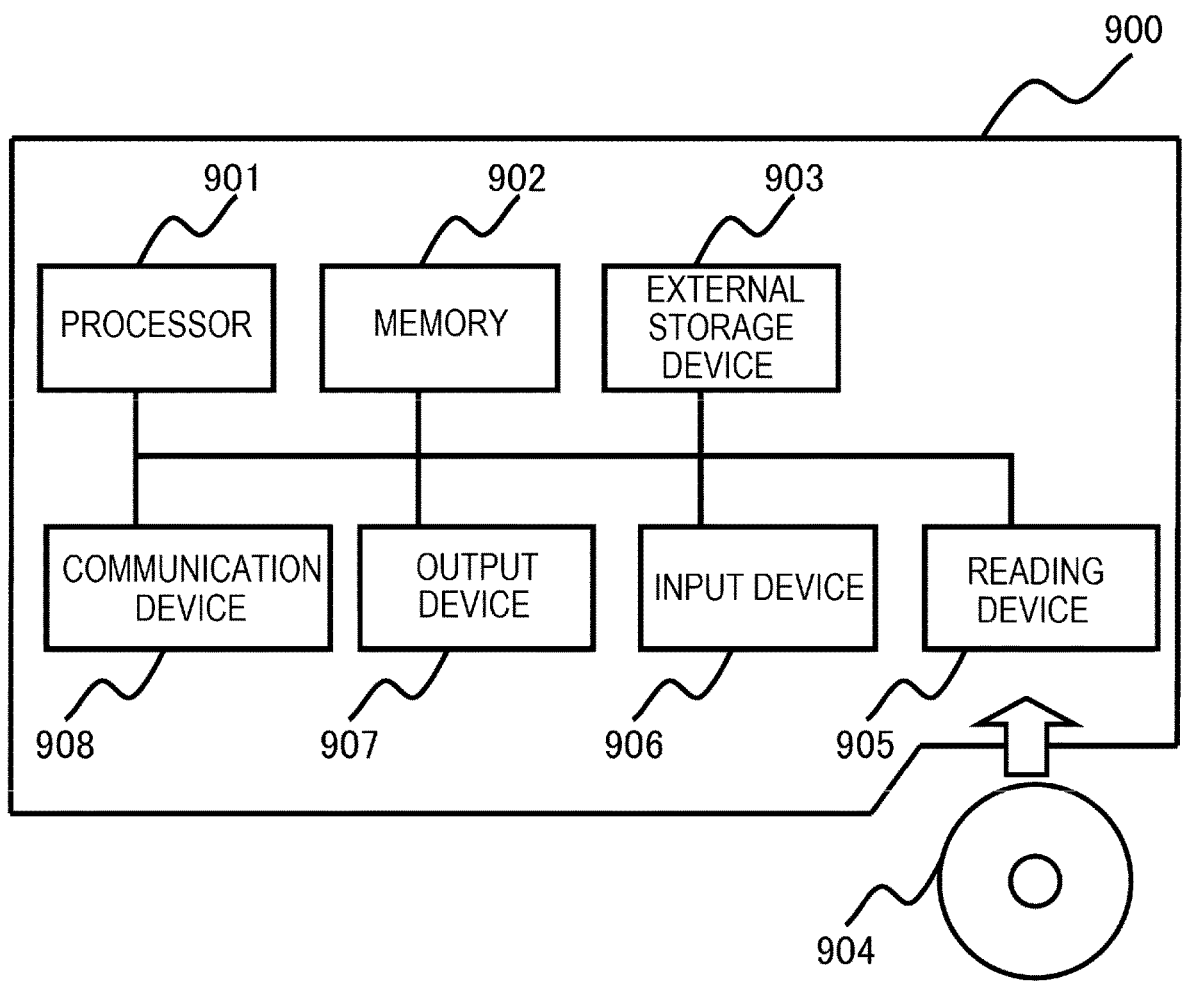
FIG. 4 is a diagram illustrating an example of a hardware configuration of the facility diagnosis device.

FIG. 4 is a diagram illustrating an example of a hardware configuration of the facility diagnosis device. The facility diagnosis device 100 can be implemented by a general computer 900, or a network system that includes a plurality of such computers 900. The computer 900 includes a processor 901 (for example, CPU or GPU), a memory 902 such as a random access memory (RAM), an external storage device 903 such as a hard disk device (HDD) or an SSD, a reading device 905 that reads information from a portable storage medium 904 such as a CD or a DVD, an input device 906 such as a keyboard, a mouse, a barcode reader, or a touch panel, an output device 907 such as a display, and a communication device 908 that communicates with another computer via a communication network such as LAN or the Internet. It is needless to say that the reading device 905 may be capable of not only reading but also writing the portable storage medium 904.

For example, the processing units, including the deterioration detection unit 101, the deterioration degree prediction unit 103, the KPI calculation unit 104, the deterioration prevention determination unit 105, and the control information output unit 110, can be implemented by loading a predetermined program stored in the external storage device 903 into the memory 902 and executing the predetermined program by the processor 901. The input unit can be implemented by the processor 901 using the input device 906. The output unit can be implemented by the processor 901 using the output device 907 or the communication device 908. The communication unit can be implemented by the processor 901 using the communication device 908. The deterioration prevention mode definition storage unit 102, as a storage unit, can be implemented by the processor 901 using the memory 902 or the external storage device 903.

The predetermined program may be downloaded from the portable storage medium 904 via the reading device 905 or from the network via the communication device 908 to the external storage device 903 and then loaded into the memory 902 and executed by the processor 901. Alternatively, the predetermined program may be directly loaded into the memory 902 from the portable storage medium 904 via the reading device 905 or from the network via the communication device 908, and executed by the processor 901.

FIG. 5 is a diagram illustrating deterioration prediction curves and KPI prediction examples. Deterioration prediction curves 300 are each a curve in which date and time is provided on a horizontal axis and a deterioration degree of a facility to be diagnosed for deterioration or a portion thereof is plotted on a vertical axis. Since each deterioration prediction curve 300 draws a curve similar to the facility to be diagnosed for deterioration or the portion thereof in advance, by determining a coefficient parameter of the curve, the curve can be used to predict the deterioration degree for the facility to be diagnosed for deterioration or the portion thereof. An example of a deterioration curve function may be a linear function like a straight line as described above, or may be a more complicated higher-order function. Alternatively, the invention may output an array in which a numerical value of the deterioration degree at each time point is arranged, without being limited to the deterioration curve function.

The deterioration prevention mode 1 to the deterioration prevention mode 3 have different deterioration degrees, and thus are respectively predicted in the deterioration prediction curves 300. That is, a difference in inclination of the curves indicates that a progress of the deterioration of the arm A shaft 2 changes depending on the modes.

KPI prediction examples 301 are each an example in which the facility stop probability is used as the KPI. For example, based on the finding that the deterioration degree and the stop probability are in a proportional relationship, it is conceivable to multiply a slope of the deterioration prediction curve 300 by a positive constant and normalize the slope to obtain the stop probability. The KPI prediction example 301 is an example of a result of performing the KPI calculation on an example of the deterioration prediction curve 300. The KPI may be not only the facility stop probability but also, for example, a tact time or a defect rate.

Examples of the satisfaction determination include a method of determining as satisfied if the KPI is not equal to or less than a threshold value, and determining as not satisfied if not. The KPI prediction examples 301 illustrate an example of a threshold value of the stop probability. In the deterioration prevention mode 1 and the deterioration prevention mode 3 in which the deterioration degree exceeds the threshold value, since the stop probability as the KPI exceeds the threshold value within a predetermined period, it is determined that the KPI is not satisfied and only the deterioration prevention mode 2 satisfies the KPI. Next, a flow of diagnosis processing performed by the facility diagnosis device 100 will be described.

Step 1: The deterioration detection unit 101 obtains the facility feature amount from the dual-arm robot 200, estimates the deterioration degree of each portion of the dual-arm robot 200, and inputs the deteriorated portions and the deterioration degrees to the deterioration prevention determination unit 105. For example, as illustrated in FIG. 2, the deterioration detection unit 101 measures the driving current of the motor corresponding to each shaft of the dual-arm robot 200 as the facility feature amount by the current sensor, and measures the deterioration degree from the power of the harmonic band with respect to the rotation frequency.

Step 2: The deterioration prevention determination unit 105 receives the deteriorated portions and the deterioration degrees thereof output by the deterioration detection unit 101 in step 1 as inputs, refers to the deterioration prevention mode definition storage unit 102, and acquires deterioration prevention modes corresponding to the deteriorated portions as the deterioration prevention mode candidates. There may be a plurality of deterioration prevention mode candidates, and all the corresponding deterioration prevention modes are acquired here.

Step 3: The deterioration prevention determination unit 105 inputs the deteriorated portions and the deterioration degrees input by the deterioration detection unit 101 in step 1 and the deterioration prevention mode candidates acquired by the deterioration prevention mode definition storage unit 102 in step 2 to the deterioration degree prediction unit 103. The deterioration degree prediction unit 103 calculates the deterioration prediction curve 300 by using input information, and inputs a function or an array indicating the deterioration prediction curve 300 to the KPI calculation unit 104.

Step 4: The KPI calculation unit 104 obtains the deterioration prediction curve 300 output by the deterioration degree prediction unit 103 as an input, executes the KPI calculation and the satisfaction determination, and outputs the KPI calculation result and the satisfaction determination result (designation of a satisfied deterioration prevention mode) to the deterioration prevention determination unit 105.

An output method of the KPI calculation result may be outputting an array in which a numerical value of the KPI calculation result at each time point is arranged, without being limited to a graph as in the KPI prediction example 301.

Step 5: The deterioration prevention determination unit 105 receives the KPI calculation result and the satisfaction determination result of each deterioration prevention mode candidate from the KPI calculation unit 104 as inputs, determines to adopt one determined as satisfied among the deterioration prevention mode candidates as the deterioration prevention mode, and outputs information for specifying an employed deterioration prevention mode to the control information output unit 110.

Step 6: The control information output unit 110 receives the information for specifying the deterioration prevention mode from the deterioration prevention determination unit 105, and outputs the control information corresponding to the deterioration prevention mode to the control input unit 201 of the dual-arm robot 200. For example, when "mode 2", which is a deterioration prevention mode illustrated in FIG. 3, is received as the deterioration prevention mode, the control information output unit 110 decreases the load of the arm A shaft 1, and outputs a control program in which the loads of the arm A shaft 2 and the arm A shaft 3 are increased to the control input unit 201 as the control information.

According to the processing of steps 1 to 6 of the facility diagnosis device 100 described above, the deterioration prevention mode can be dynamically determined based on prediction of various KPIs such as the facility stop probability and the manufacturing quality, and the deterioration of the dual-arm robot 200 can be prevented and the manufacturing can be performed while preventing unintended deterioration of the KPI.

The above is an example of the facility diagnosis system 10 according to the first embodiment. According to the facility diagnosis system 10 according to the first embodiment, it is possible to prevent the progress of the deterioration of the manufacturing facility while keeping the KPI within an allowable range.

Second Embodiment

Figure 6:
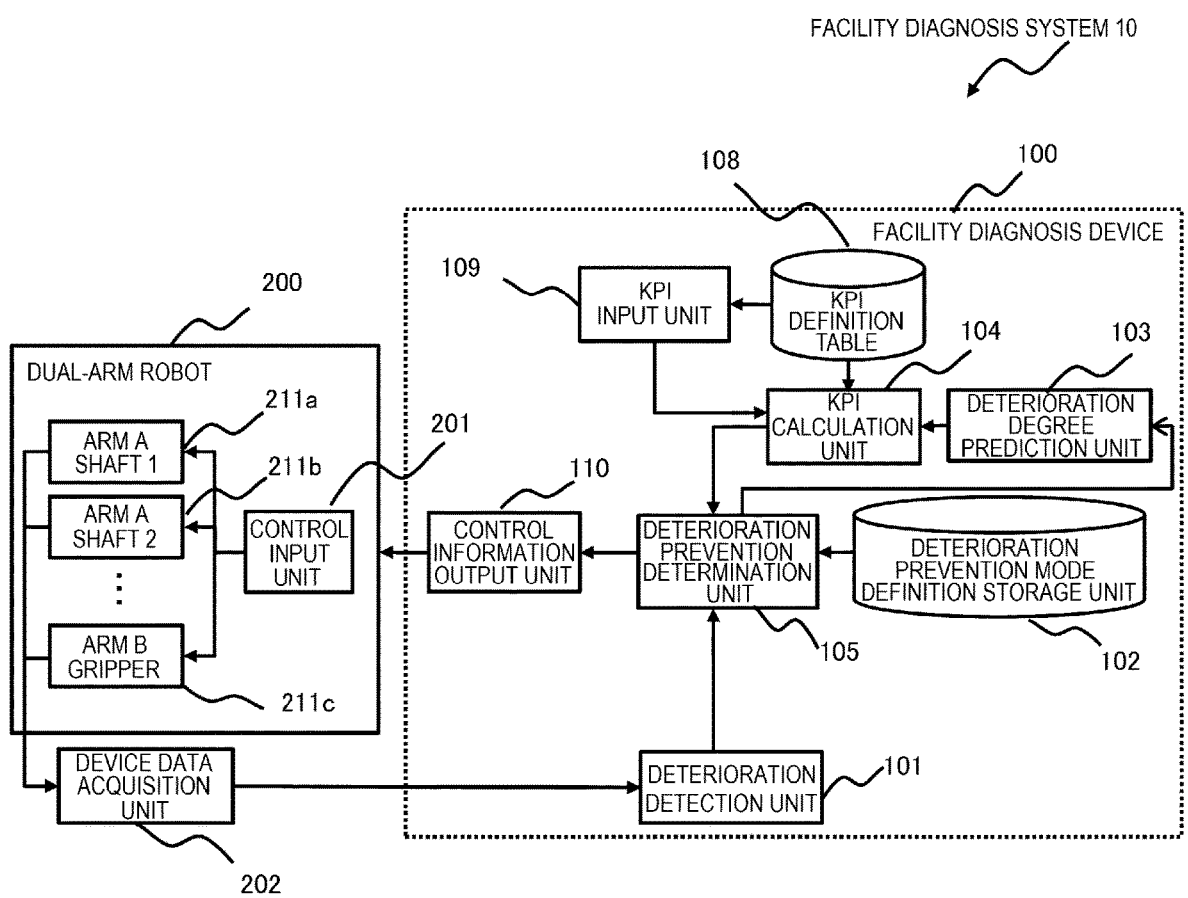
FIG. 6 is a diagram illustrating a configuration example of a facility diagnosis system according to a second embodiment.

FIG. 6 is a diagram illustrating a configuration example of a facility diagnosis system according to a second embodiment. A facility diagnosis system 10 according to the second embodiment is basically the same, but also has differences from the facility diagnosis system 10 according to the first embodiment. Hereinafter, the differences will be mainly described.

As illustrated in FIG. 6, a facility diagnosis device 100 includes a KPI definition table 108 and a KPI input unit 109 in addition to the facility diagnosis device 100 according to the first embodiment.

FIG. 7 is a diagram illustrating a data structure example of the KPI definition table 108. The KPI definition table 108 stores a list of KPIs that can be calculated by the KPI calculation unit 104. In the KPI definition table 108, a satisfaction determination method 108b is stored in association with the KPI 108a. The KPI definition table 108 is stored in the memory 902 or the external storage device 903. That is, the KPI definition table 108 can also be referred to as a KPI definition table storage unit.

For example, in the KPI definition table 108, the KPI "facility stop probability" is associated with "facility stop probability≤(less than or equal to) 0.01%" as a satisfaction determination method. Similarly, for the KPI "tact time", "tact time≤(less than or equal to) 1 minute" is associated as the satisfaction determination method, and for the KPI "defect rate", "defect rate (less than or equal to) 0.0001%" is associated as the satisfaction determination method. Similarly, the satisfaction determination method is also stored in association with other KPIs.

The KPI input unit 109 receives a selection input of a KPI to be used for determination of the deterioration prevention mode. Specifically, the KPI input unit 109 receives the selection input of the KPI via the input device 906, and passes the selection input to the KPI calculation unit 104.

Figure 8:
FIG. 8 is a diagram illustrating an example of a KPI input screen.

FIG. 8 is a diagram illustrating an example of a KPI input screen. A KPI input screen 109g includes an input region 109h that indicates contents of the KPI definition table 108 as KPI options and receives an input of a KPI to be used. A user can input selection of the KPI to be used for the determination of the deterioration prevention mode to the input region 109h.

In the facility diagnosis device 100 according to the second embodiment, regarding steps 1 to 6 of the diagnosis processing performed by the facility diagnosis device 100 according to the first embodiment, before step 1, the KPI input unit 109 displays the KPI input screen 109g and receives the input of the KPI to be used (step 0). Furthermore, in step 4, the KPI calculation unit 104 obtains the deterioration prediction curve 300 output by the deterioration degree prediction unit 103 as an input, performs the KPI calculation and the satisfaction determination by using the KPI and the satisfaction determination method received in step 0, and outputs the KPI calculation result and the satisfaction determination result (designation of the satisfied deterioration prevention mode) to the deterioration prevention determination unit 105.

The above is the facility diagnosis system 10 according to the second embodiment. According to the facility diagnosis system 10 according to the second embodiment, the deterioration prevention mode can be used by using a KPI desired by the user.

Third Embodiment

Figure 9:
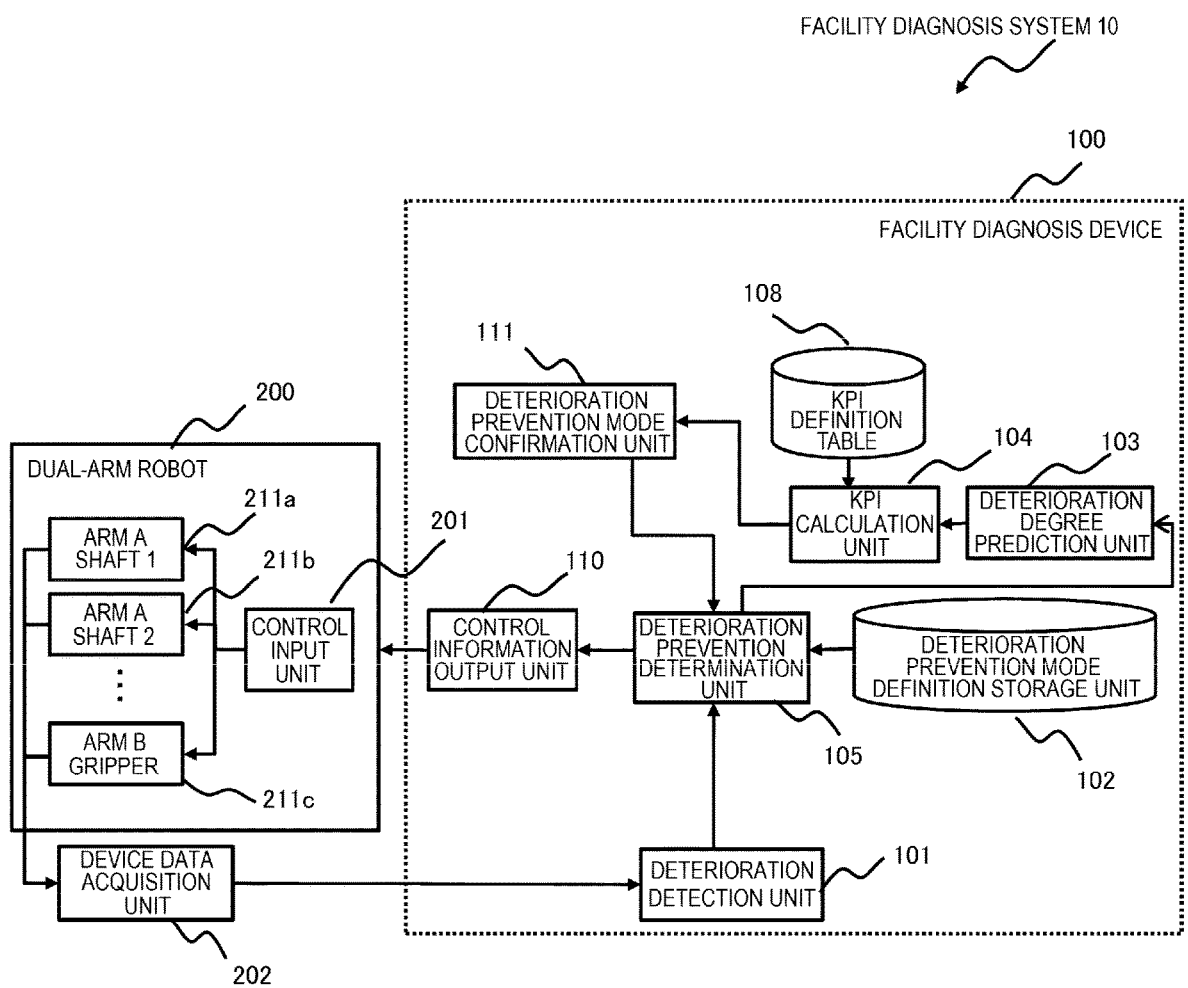
FIG. 9 is a diagram illustrating a configuration example of a facility diagnosis system according to a third embodiment.

FIG. 9 is a diagram illustrating a configuration example of a facility diagnosis system according to a third embodiment. A facility diagnosis system 10 according to the third embodiment is basically the same, but has differences from the facility diagnosis system 10 according to the first embodiment. Hereinafter, the differences will be mainly described.

As illustrated in FIG. 9, a facility diagnosis device 100 includes a KPI definition table 108 and a deterioration prevention mode confirmation unit 111 in addition to the facility diagnosis device 100 according to the first embodiment.

Since the KPI definition table 108 is the same as the KPI definition table 108 according to the second embodiment, description thereof will be omitted.

The deterioration prevention mode confirmation unit 111 outputs one or both of the KPI calculation result and the satisfaction determination result for each of the deterioration prevention modes, and causes the user to input selection of a deterioration prevention mode to be executed.

Figure 10:
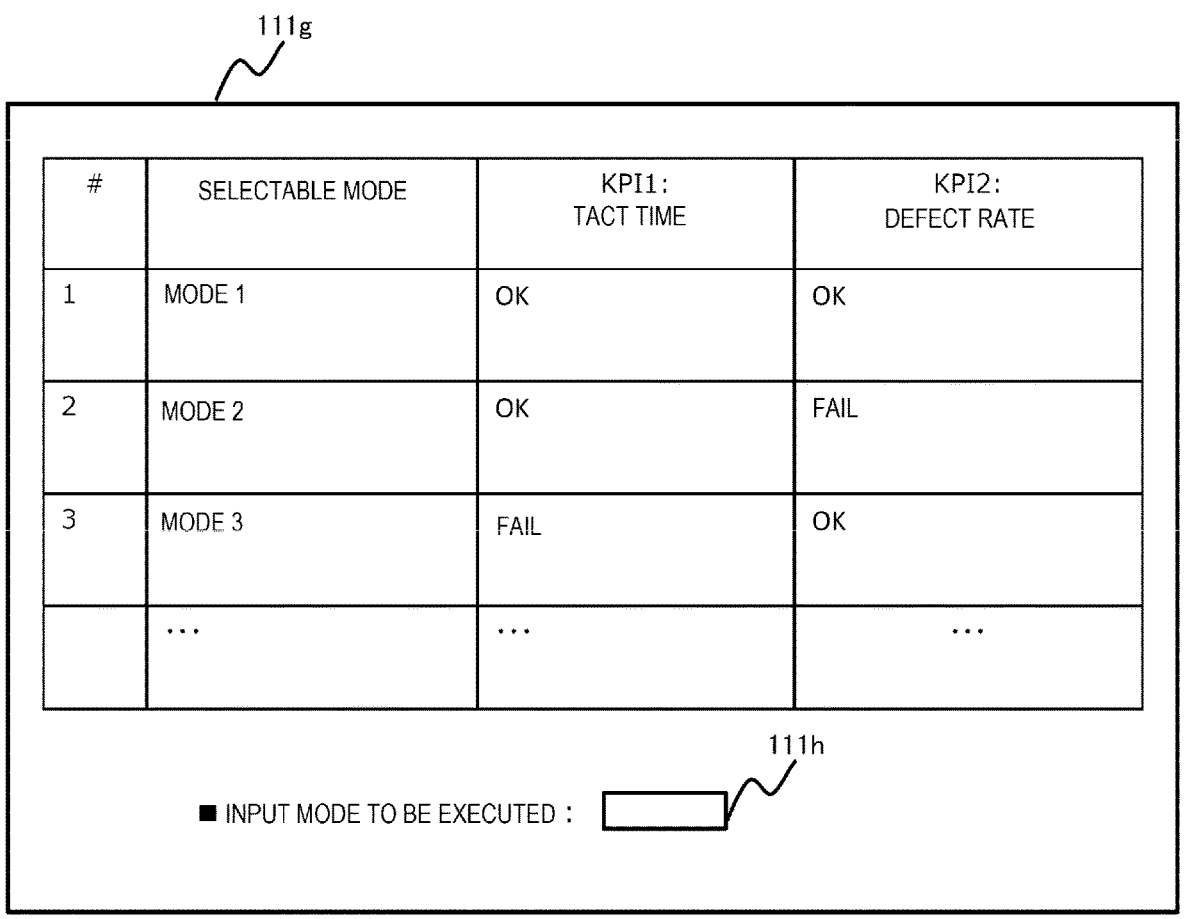
FIG. 10 is a diagram illustrating an example of a deterioration prevention mode selection screen.

FIG. 10 is a diagram illustrating an example of a deterioration prevention mode selection screen. A deterioration prevention mode selection screen 111g includes an input region 111h that illustrates a selectable deterioration prevention mode and satisfaction/non-satisfaction (in the example of FIG. 10, satisfaction is "OK" and non-satisfaction is "fail") of each of the KPIs when the mode is adopted, and receives input of the deterioration prevention mode to be executed. The user can input selection of the deterioration prevention mode to be executed in the input region 111h.

In the facility diagnosis device 100 according to the third embodiment, regarding steps 1 to 6 of the diagnosis processing performed by the facility diagnosis device 100 according to the first embodiment, in step 4, the KPI calculation unit 104 obtains the deterioration prediction curve 300 output by the deterioration degree prediction unit 103 as an input, and performs the KPI calculation and the satisfaction determination for each of the KPI and the satisfaction determination method in a preset KPI definition table 108. The deterioration prevention mode confirmation unit 111 displays, on the deterioration prevention mode selection screen 111g, a KPI calculation result and a satisfaction determination result (satisfaction/non-satisfaction of the KPI) for each KPI in a deterioration prevention mode in which at least one KPI can be satisfied. When the deterioration prevention mode confirmation unit 111 receives the deterioration prevention mode to be executed received in the input region 111h, the deterioration prevention mode to be executed, the KPI calculation result, and the satisfaction determination result are passed to the deterioration prevention mode confirmation unit 111.

Then, in step 5, the deterioration prevention determination unit 105 receives the KPI calculation result and the satisfaction determination result of the deterioration prevention mode to be executed from the deterioration prevention mode confirmation unit 111 as inputs, and outputs information for specifying the deterioration prevention mode to the control information output unit 110.

The above is the facility diagnosis system 10 according to the third embodiment. According to the facility diagnosis system 10 according to the third embodiment, since a satisfaction result of the KPI can be confirmed before execution, it is possible to prevent the user from executing an unintended deterioration prevention mode.

Fourth Embodiment

Figure 11:
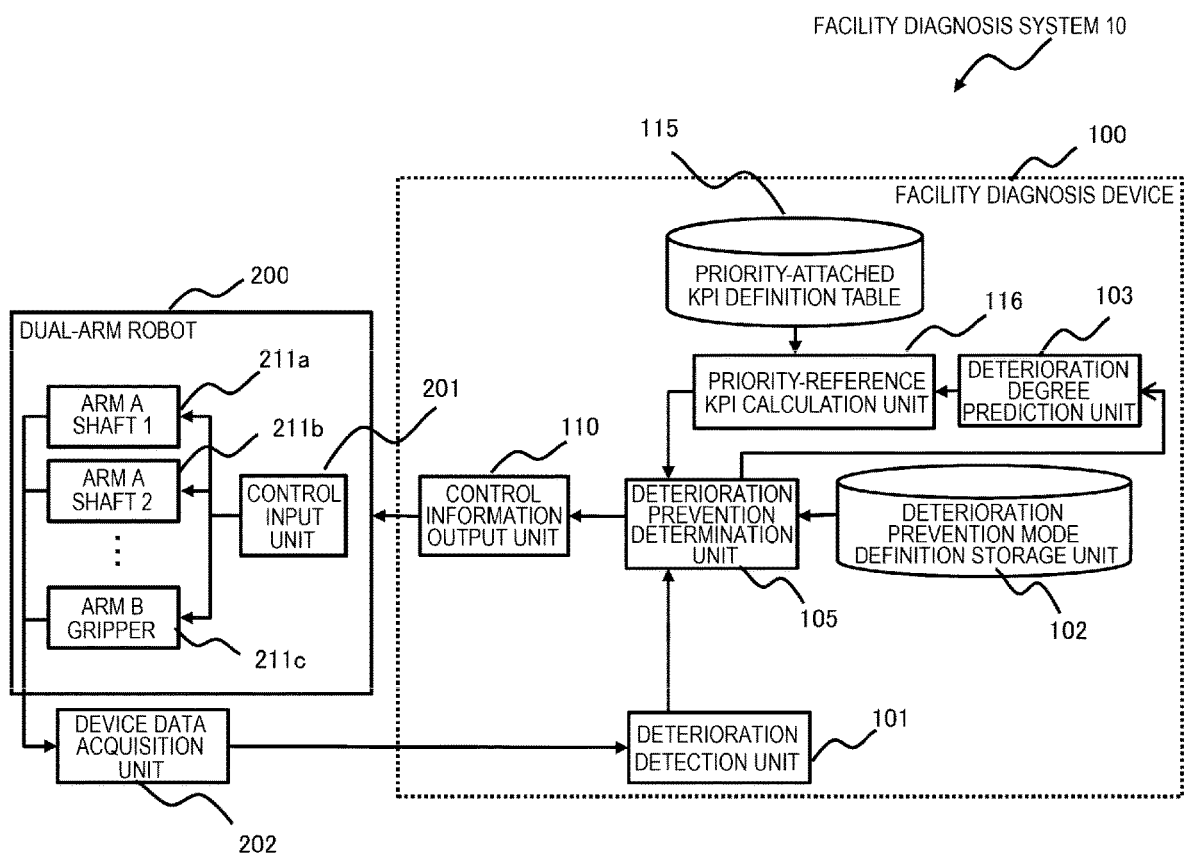
FIG. 11 is a diagram illustrating a configuration example of a facility diagnosis system according to a fourth embodiment.

FIG. 11 is a diagram illustrating a configuration example of a facility diagnosis system according to a fourth embodiment. A facility diagnosis system 10 according to the fourth embodiment allows a next best or best deterioration prevention mode to be selected when no deterioration prevention modes or a plurality of deterioration prevention modes satisfy the KPI. The facility diagnosis system 10 according to the fourth embodiment is basically the same as the facility diagnosis system 10 according to the first embodiment. Hereinafter, differences will be mainly described.

As illustrated in FIG. 11, a facility diagnosis device 100 according to the fourth embodiment includes a priority-reference KPI calculation unit 116 instead of the KPI calculation unit 104 provided in the facility diagnosis device 100 according to the first embodiment. In addition, the facility diagnosis device 100 according to the fourth embodiment includes a priority-attached KPI definition table 115.

FIG. 12 is a diagram illustrating a data structure example of a priority-attached KPI definition table. In the priority-attached KPI definition table 115, a satisfaction determination method 115b and a priority 115c are associated and stored in association with a KPI 115a. The priority-attached KPI definition table 115 is stored in the memory 902 or the external storage device 903.

For example, in the priority-attached KPI definition table 115, the KPI "facility stop probability" is associated with "facility stop probability≤(less than or equal to) 0.01%" as the satisfaction determination method, and "1" is associated as the priority. Similarly, the KPI "tact time" is associated with "tact time≤(less than or equal to) 1 minute" as the satisfaction determination method, and "2" is associated as the priority. The KPI "defect rate" is associated with "defect rate≤(less than or equal to) 0.0001%" as the satisfaction determination method, and "3" is associated as the priority. Similarly, the satisfaction determination method and the priority are also stored in association with other KPIs.

In the facility diagnosis device 100 according to the fourth embodiment, regarding steps 1 to 6 of the diagnosis processing performed by the facility diagnosis device 100 according to the first embodiment, in step 4, the priority-reference KPI calculation unit 116 obtains the deterioration prediction curve 300 output by the deterioration degree prediction unit 103 as an input, and executes the KPI calculation and the satisfaction determination for each of the KPI and the satisfaction determination method in descending order of the priority in a preset priority-attached KPI definition table 115.

Here, when there is only one deterioration prevention mode candidate determined as "satisfied", the priority-reference KPI calculation unit 116 outputs the deterioration prevention mode to the deterioration prevention determination unit 105, and the control proceeds to step 5.

On the other hand, when a plurality of deterioration prevention mode candidates are determined as satisfied, the following processing (a) is executed, and no deterioration prevention mode candidates are determined as satisfied, the following processing (b) is executed.

(a) When a plurality of deterioration prevention mode candidates are determined as satisfied, the priority-reference KPI calculation unit 116 preferentially adopts a mode having a high satisfaction degree in different KPIs among the satisfied deterioration prevention mode candidates. Specifically, the priority-reference KPI calculation unit 116 refers to the priority-attached KPI definition table 115 again, performs the same calculation as in step 4 according to the first embodiment by using a KPI having a next highest priority, and obtains the KPI calculation result and the satisfaction determination result to narrow down the deterioration prevention mode. The priority-reference KPI calculation unit 116 repeats the above processing for different KPIs until no deterioration prevention mode candidates are determined as satisfied.

The priority-reference KPI calculation unit 116 outputs, to the deterioration prevention determination unit 105, the deterioration prevention mode candidates that remained last. Alternatively, when deterioration prevention mode candidates that satisfy all the KPIs is obtained, the priority-reference KPI calculation unit 116 outputs these candidates to the deterioration prevention determination unit 105.

(b) When no deterioration prevention mode candidates are determined as satisfied, the priority-reference KPI calculation unit 116 refers to the priority-attached KPI definition table 115 again, performs the same calculation as in step 4 according to the first embodiment by using a KPI having a next highest priority, and obtains the KPI calculation result and the satisfaction determination result. The priority-reference KPI calculation unit 116 repeats the above processing until a deterioration prevention mode candidate determined as satisfied is obtained, and outputs the deterioration prevention mode candidate to the deterioration prevention determination unit 105.

The above is the facility diagnosis system 10 according to the fourth embodiment. The processing performed by the priority-reference KPI calculation unit 116 can also be implemented by the KPI calculation unit 104 according to the first embodiment performing the KPI calculation and the satisfaction determination of the predetermined condition according to the priorities. According to the facility diagnosis system 10 according to the fourth embodiment, when no deterioration prevention modes satisfy the KPI, or when a plurality of deterioration prevention modes satisfy the KPI, the next best or best deterioration prevention mode can be selected.

Fifth Embodiment

Figure 13:
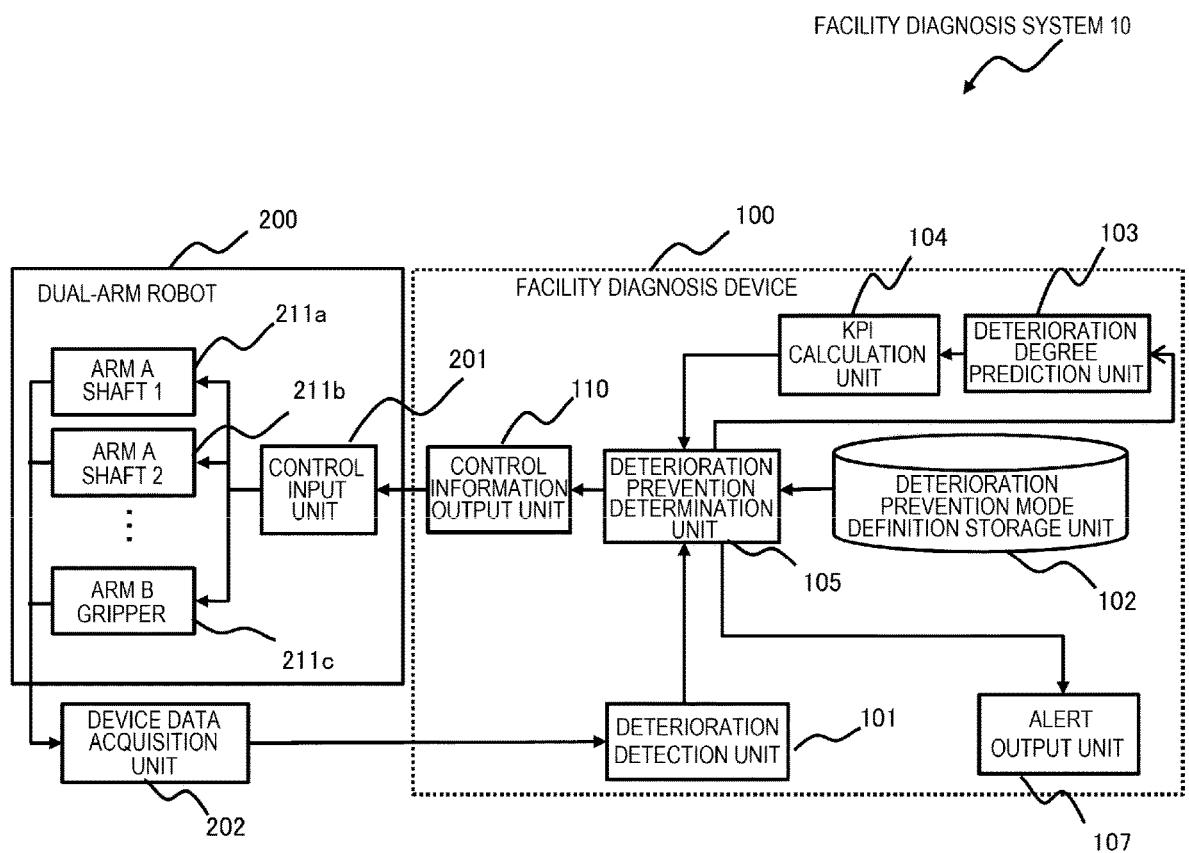
FIG. 13 is a diagram illustrating a configuration example of a facility diagnosis system according to a fifth embodiment.

FIG. 13 is a diagram illustrating a configuration example of a facility diagnosis system according to a fifth embodiment. A facility diagnosis system 10 according to the fifth embodiment can output an alert to the outside the system when no deterioration prevention modes satisfy the KPI. The facility diagnosis system 10 according to the fifth embodiment is basically the same as the facility diagnosis system 10 according to the first embodiment. Hereinafter, differences will be mainly described.

As illustrated in FIG. 13, a facility diagnosis device 100 according to the fifth embodiment includes an alert output unit 107 in addition to the facility diagnosis device 100 according to the first embodiment.

The alert output unit 107 outputs an alert including a predetermined error message, error information, and the like to an external monitoring device (not illustrated) or the like. When no deterioration prevention modes satisfy a predetermined threshold value for a pre-defined KPI, the deterioration prevention determination unit 105 causes the alert output unit 107 to output an alert. In other words, the deterioration prevention determination unit 105 outputs a predetermined alert when none of the deterioration prevention modes satisfies the predetermined condition as a result of the satisfaction determination of the predetermined condition by the KPI calculation unit 104.

The above is the facility diagnosis system 10 according to the fifth embodiment. According to the facility diagnosis system 10 according to the fifth embodiment, it is possible to output an alert when no deterioration prevention modes satisfy the KPI.

Sixth Embodiment

Figure 14:
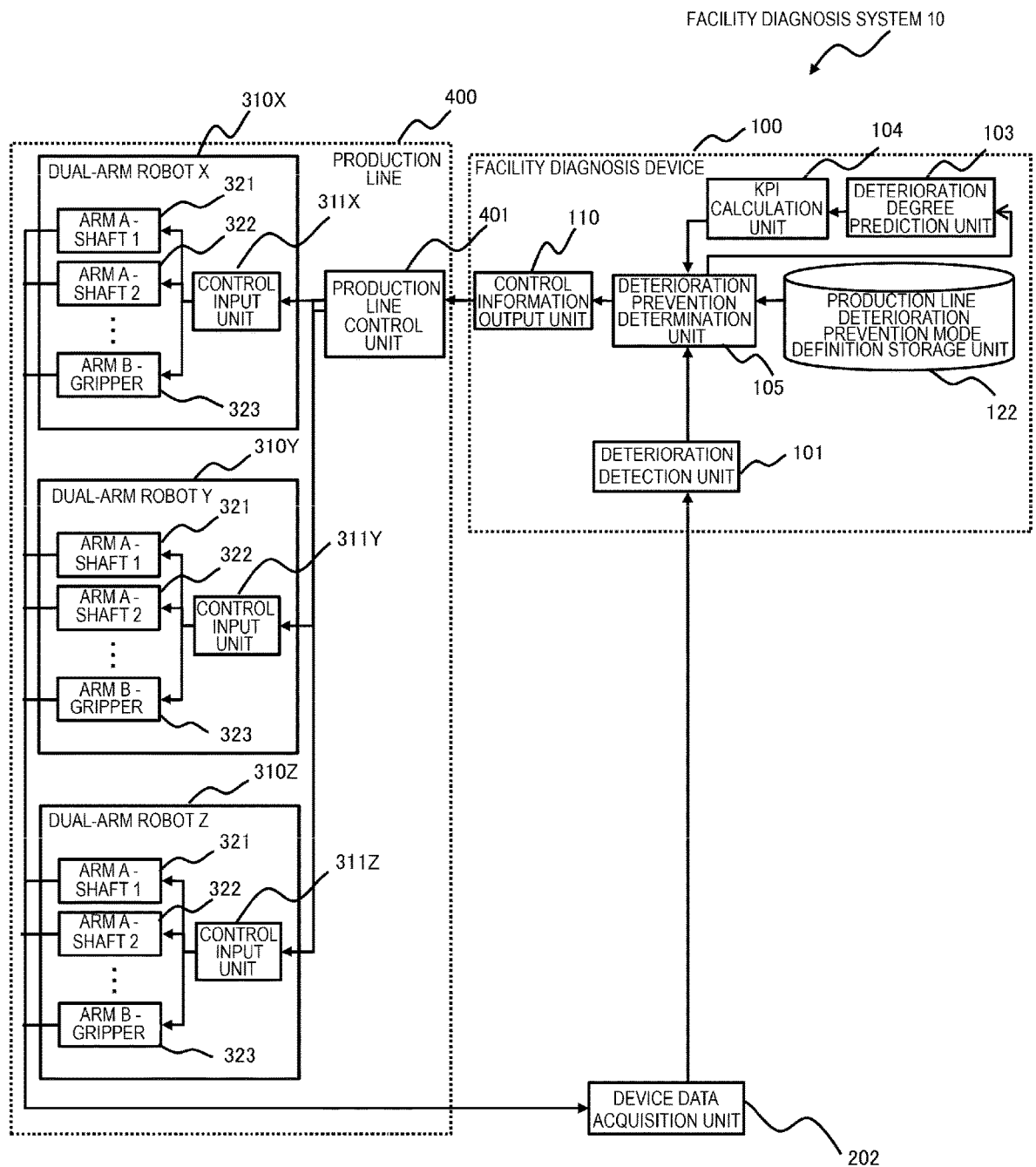
FIG. 14 is a diagram illustrating a configuration example of a facility diagnosis system according to a sixth embodiment.

FIG. 14 is a diagram illustrating a configuration example of a facility diagnosis system according to a sixth embodiment. A facility diagnosis system 10 according to the sixth embodiment is not limited to the control of the deterioration prevention mode when the diagnosis target facility is a single device, and is expanded to a deterioration prevention mode of an entire production line 400 including a plurality of manufacturing devices (a plurality of dual-arm robots).

The production line 400 includes a dual-arm robot X (310X), a dual-arm robot Y (310Y), and a dual-arm robot Z (310Z). The dual-arm robot X (310X), the dual-arm robot Y (310Y), and the dual-arm robot Z (310Z) include control input units 311X, 311Y, and 3112 that receive control for the devices thereof, respectively.

In addition, similarly to the dual-arm robot 200 according to the first embodiment, the dual-arm robot X (310X), the dual-arm robot Y (310Y), and the dual-arm robot Z (310Z) each include two 3-axis movable arms. The dual-arm robot X (310X), the dual-arm robot Y (310Y), and the dual-arm robot Z (310Z) cooperatively assemble one product.

The production line 400 includes a production line control unit 401, and when the production line control unit 401 receives the control information from the facility diagnosis device 100, the production line control unit 401 issues a control instruction to each control input unit of the dual-arm robot. The facility diagnosis system 10 according to the sixth embodiment is basically the same as the facility diagnosis system 10 according to the first embodiment. Hereinafter, differences will be mainly described.

As illustrated in FIG. 14, the facility diagnosis device 100 according to the sixth embodiment includes a production line deterioration prevention mode definition storage unit 122 instead of the deterioration prevention mode definition storage unit 102 in the facility diagnosis device 100 according to the first embodiment. In addition, the device data acquisition unit 202 acquires information on the control target portions of the dual-arm robot X (310X), the dual-arm robot Y (310Y), and the dual-arm robot Z (310Z).

FIG. 15 is a diagram illustrating a data structure example of a production line deterioration prevention mode definition storage unit. The production line deterioration prevention mode definition storage unit 122 is basically the same as the deterioration prevention mode definition storage unit 102 according to the first embodiment. However, since the diagnosis target facility is the production line 400, each deteriorated portion 122b has a deterioration prevention mode 122a and an operation method definition for each of the plurality of dual-arm robots provided in the production line 400 (a robot X operation method definition 122c, a robot Y operation method definition 122j, and a robot Z operation method definition 122k). That is, it can be said that the production line deterioration prevention mode definition storage unit 122 includes an operation control method for preventing deterioration of a manufacturing facility constituting the production line 400 or a portion of the manufacturing facility for each of predetermined deterioration prevention modes.

The operation method definition of each dual-arm robot includes an operation mode for each of the control portions of the arm of the dual-arm robot 200, and includes, for example, a gripper 122d indicating a gripper of an arm A of the dual-arm robot X, a shaft 1 (122e) indicating a movable shaft 1 of the arm A of the dual-arm robot X, a shaft 2 (122f) indicating a movable shaft 2 of the arm A of the dual-arm robot X, and a shaft 3 (122g) indicating a movable shaft 3 of the arm A of the dual-arm robot X. An arm B (122h) indicating an entire arm B of the dual-arm robot X may be included. Alternatively, an operation mode indicating the entire dual-arm robot Y or the entire dual-arm robot Z may be included.

Here, the deterioration prevention mode 122a is the "mode 3" and is a deterioration prevention mode corresponding to a case where an arm B shaft 1 of the dual-arm robot X (310X) is also in a deteriorated state in addition to the arm A shaft 1 of the dual-arm robot X (310X). Specifically, the "mode 3" is a deterioration prevention mode in which utilization of the dual-arm robot X (310X) per se is cancelled, and reduction in an operation rate of the entire production line 400 is compensated by increasing operation rates of the dual-arm robot Y (310Y) and the dual-arm robot Z (310Z). Next, among the flow of the diagnosis processing performed by the facility diagnosis device 100, processing different from that of the first embodiment is mainly illustrated.

Step 1: The deterioration detection unit 101 obtains the facility feature amount from control target portions of the dual-arm robot X (310X), the dual-arm robot Y (310Y), and the dual-arm robot Z (310Z), estimates deterioration degrees of the control target portions of the dual-arm robot X (310X), the dual-arm robot Y (310Y), and the dual-arm robot Z (310Z), and inputs deteriorated portions and deterioration degrees to the deterioration prevention determination unit 105.

Step 2: The deterioration prevention determination unit 105 receives the deteriorated portions and the deterioration degrees thereof output by the deterioration detection unit 101 in step 1 as inputs, refers to the production line deterioration prevention mode definition storage unit 122, and acquires deterioration prevention modes corresponding to the deteriorated portions as deterioration prevention mode candidates. There may be a plurality of deterioration prevention mode candidates, and all the corresponding deterioration prevention modes are acquired here.

Step 3: The deterioration prevention determination unit 105 inputs the deteriorated portions and the deterioration degrees input by the deterioration detection unit 101 in step 1 and the deterioration prevention mode candidates acquired by the production line deterioration prevention mode definition storage unit 122 in step 2 to the deterioration degree prediction unit 103. The deterioration degree prediction unit 103 calculates the deterioration prediction curve 300 by using input information, and inputs a function or an array indicating the deterioration prediction curves 300 to the KPI calculation unit 104.

Step 6: The control information output unit 110 receives the information for specifying the deterioration prevention mode from the deterioration prevention determination unit 105, and outputs the control information corresponding to the deterioration prevention mode to the production line control unit 401 of the production line 400. For example, when the "mode 3", which is the deterioration prevention mode illustrated in FIG. 15, is received as the deterioration prevention mode, the control information output unit 110 stops the dual-arm robot X (310X), and outputs a control program in which loads of the dual-arm robot Y (310Y) and the dual-arm robot Z (310Z) are increased to the production line control unit 401 as the control information. That is, it can be said that the control information output unit 110 outputs the control information on the manufacturing facility constituting the production line or the portion thereof according to the deterioration prevention mode that should be executed.

According to the processing of steps 1 to 6 of the facility diagnosis device 100 described above, the deterioration prevention mode can be dynamically determined based on the prediction of various KPIs such as facility stop probability and manufacturing quality of the production line 400, and the manufacturing can be performed by adopting the deterioration prevention mode for compensating work of a specific dual-arm robot by replacing the work of the specific dual-arm robot with the other dual-arm robot of the same production line. When the production line stop probability is a KPI, by adopting such a deterioration prevention mode, it is possible to continue manufacturing of the entire production line 400 even when the device is stopped in a worst case.

The above is an example of the facility diagnosis system 10 according to the sixth embodiment. According to the device diagnosis system 10 according to the sixth embodiment, it is possible to prevent the progress of the deterioration of the manufacturing facility while keeping the KPI within an allowable range.

The invention is not limited to the embodiments described above, and includes various modifications. For example, the embodiment described above has been described in detail for easy understanding of the invention, and the invention is not necessarily limited to those including all of the configurations described above. It is possible to replace a part of a configuration according to an embodiment with another configuration, and it is also possible to add a configuration according to an embodiment to a configuration according to another embodiment. It is also possible to delete a part of a configuration of an embodiment.

Units, configurations, functions, processing units, and the like described above may be partially or entirely implemented by hardware such as through design using an integrated circuit. In addition, each of the configurations, the functions and the like described above may be implemented by software by interpreting and executing a program that implements respective functions by a processor. Information such as programs, tables, and files for implementing the functions can be stored on recording devices such as memories and hard disks, or recording media such as IC cards, SD cards, and DVDs.

Control lines and information lines according to the embodiment described above indicate what is considered necessary for the description, and not all of the control lines and the information lines are necessarily shown in a product. In fact, it is conceivable that almost all of the configurations are interconnected. The invention has been described above mainly with respect to the embodiments.

What is claimed is:

1. A facility diagnosis system comprising:
a robot having a plurality of arms, each arm having a motor driving the arm and a current sensor measuring a current of the motor; and
a central processing unit (CPU) coupled to the robot via a network, the CPU programmed to:
store information including an operation control method for preventing deterioration of the plurality of arms of the robot for each of a plurality of predetermined deterioration prevention modes,
calculate a predetermined key performance indicator (KPI) by using a deterioration degree predicted for each of the plurality of predetermined deterioration prevention modes for the plurality of arms of the robot, and determine whether the predetermined KPI satisfies a predetermined condition,
determine a deterioration prevention mode that should be executed based on a satisfaction determination result, and
output control information to the robot according to the deterioration prevention mode that should be executed, the control information defining an operation load for each arm of the robot,
wherein the robot is configured to control the operation load of each arm based on the control information.

2. The facility diagnosis system according to claim 1, wherein the CPU is programmed to:
store a list of KPIs to be calculated.

3. The facility diagnosis system according to claim 1, wherein the CPU is programmed to output one or both of a KPI calculation result and the satisfaction determination result for each of the plurality of predetermined deterioration prevention modes, and receive a selection input of the deterioration prevention mode to be executed.

4. The facility diagnosis system according to claim 1, wherein the CPU is programmed to:
store a list of KPIs to be calculated and priorities of the list of KPIs, and
perform KPI calculation and satisfaction determination of the predetermined condition according to the priorities of the list of KPIs, and specify a satisfied deterioration prevention mode.

5. The facility diagnosis system according to claim 1, wherein the CPU is programmed to output a predetermined alert when none of the plurality of predetermined deterioration prevention modes satisfies the predetermined condition as a result of satisfaction determination of the predetermined condition by the KPI calculation unit.

6. The facility diagnosis system according to claim 1, wherein the CPU is programmed to:
output deterioration prediction curves for predicting deterioration degrees when the plurality of determined deterioration prevention modes are adopted for a manufacturing facility or a portion of the manufacturing facility, and
calculate the predetermined KPI by using a deterioration prediction curve.

7. A facility diagnosis method of an information processing system, wherein the information processing system includes: a robot having a plurality of arms, each arm having a motor driving the arm and a current sensor measuring a current of the motor; and a central processing unit (CPU) coupled to the robot via a network, the facility diagnosis method comprising:
storing, by the CPU, information including an operation control method for preventing deterioration of the plurality of arms of the robot for each of a plurality of predetermined deterioration prevention modes;
calculating a predetermined key performance indicator (KPI) by using a deterioration degree predicted for each of the plurality of predetermined deterioration prevention modes for the plurality of arms of the robot, and determining whether the predetermined KPI satisfies a predetermined condition;
determining a deterioration prevention mode that should be executed from a satisfaction determination result;
outputting to the robot control information according to the deterioration prevention mode that should be executed, the control information defining an operation load for each arm of the robot; and
controlling, by the robot, the operation load of each arm based on the control information.

* * * * *